US010063739B2

(12) United States Patent
Nagahara

(10) Patent No.: US 10,063,739 B2
(45) Date of Patent: Aug. 28, 2018

(54) PRINTING APPARATUS FOR JUDGING WHETHER TO ISSUE AN ERROR NOTICE

(71) Applicant: SEIKO EPSON CORPORATION, Tokyo (JP)

(72) Inventor: Atsushi Nagahara, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 16 days.

(21) Appl. No.: 15/384,006

(22) Filed: Dec. 19, 2016

(65) Prior Publication Data

US 2017/0180598 A1 Jun. 22, 2017

(30) Foreign Application Priority Data

Dec. 21, 2015 (JP) ................................. 2015-248272

(51) Int. Cl.
*H04N 1/32* (2006.01)
*H04N 1/00* (2006.01)
*G06K 15/02* (2006.01)
*G06F 3/12* (2006.01)

(52) U.S. Cl.
CPC ........... *H04N 1/32662* (2013.01); *H04N 1/00* (2013.01); *H04N 1/00042* (2013.01); *H04N 1/00045* (2013.01); *H04N 1/32128* (2013.01); *G06F 3/1256* (2013.01); *G06K 15/025* (2013.01); *G06K 15/026* (2013.01); *H04N 1/00002* (2013.01); *H04N 1/00029* (2013.01); *H04N 1/00037* (2013.01); *H04N 1/00047* (2013.01); *H04N 2201/0082* (2013.01); *H04N 2201/3202* (2013.01); *H04N 2201/3259* (2013.01)

(58) Field of Classification Search
None
See application file for complete search history.

(56) References Cited

U.S. PATENT DOCUMENTS

2001/0028398 A1* 10/2001 Takahashi .......... H04N 1/00167
                                                                    348/231.99
2003/0076518 A1*  4/2003 Miyake .............. H04N 1/00002
                                                                    358/1.9
2009/0083582 A1   3/2009 Kil et al.
(Continued)

FOREIGN PATENT DOCUMENTS

JP    2008-158571    7/2008
JP    2014-057226    3/2014

OTHER PUBLICATIONS

European Search Report for Application No. 16205494.4 dated Jun. 16, 2017.

*Primary Examiner* — Miya J Williams
(74) *Attorney, Agent, or Firm* — WORKMAN NYDEGGER

(57) ABSTRACT

A printing apparatus comprises: a printing section that prints out print data onto a medium; an imaging section that captures an image of a print result on the medium; and an error notification section that performs error notification in a case of occurrence of an error during the printing of the print data. The error notification section judges whether to issue an error notice or not. In a case of an affirmative judgment to issue the error notice, the error notification section acquires a print image showing the print result by using the imaging section and transmits the acquired print image together with the error notice.

7 Claims, 12 Drawing Sheets

(56) References Cited

U.S. PATENT DOCUMENTS

| | | | |
|---|---|---|---|
| 2010/0225962 A1* | 9/2010 | Okigami | H04L 63/0492 358/1.15 |
| 2014/0093139 A1* | 4/2014 | Yamagishi | H04N 1/00034 382/112 |
| 2014/0307282 A1* | 10/2014 | Sato | H04N 1/00307 358/1.14 |
| 2015/0138581 A1 | 5/2015 | Aso | |
| 2017/0192726 A1* | 7/2017 | Bhaskaran | G06F 3/1261 |

* cited by examiner

FIG. 4

Device Registration

Device Name: [Tablet A ▼] [New]

Maximum resolution: [1920 × 1200 ▼]
Network environment: [LTE (100 Mbps or higher) ▼]
Profile information: [c:¥profiles¥pc1.icc] 📁
E-mail address: [aaa@bbb.com]

User Setting

[Device Information] [Notification Information] [Environmental Setting]

Cloud use: [Not used ▼] — F3
Image attachment: [100 Mbps or higher ▼] — F4

— DG1

TG3

PRINTING APPARATUS FOR JUDGING WHETHER TO ISSUE AN ERROR NOTICE

BACKGROUND

1. Technical Field

An aspect of the present invention relates to a printing apparatus. Another aspect relates to a printing apparatus control method, and to a computer-readable storage medium storing a program

2. Related Art

The following configuration is disclosed in JP-A-2014-057226. In a case of occurrence of a print error on a printing apparatus, it is judged whether there is anyone near the printing apparatus. If no one is detected, a query as to whether there is anyone in the neighborhood is sent to external devices. If there is an external device near which there is someone, a notice of the occurrence of the error and the content of the error is sent to the external device. Another example of related-art document is JP-A-2008-158571.

However, in a printing apparatus according to related art, it is difficult to notify a specified person who wants to check the result of printing of the occurrence of an error in every case without a failure. Moreover, error status is not easy to understand if the content of an error obtained by an image forming apparatus is conveyed as it is. Eagerly awaited is, therefore, the development of a technique that makes it possible to notify a specified person of an error on a printing apparatus in every case without a failure, in such a way of notification that error status is easy to understand.

SUMMARY

Some aspects of the invention can be embodied as follows.

(1) An aspect of the invention relates to a printing apparatus. The printing apparatus of this aspect comprises: a printing section that prints out print data onto a medium; an imaging section that captures an image of a print result on the medium; and an error notification section that performs error notification in a case of occurrence of an error during the printing of the print data to a specified person who has been determined in advance. The error notification section judges whether the specified person is absent inside a predetermined area that encompasses the printing apparatus or not. In a case where the specified person is judged to be absent, the error notification section acquires a print image showing the print result by using the imaging section, and transmits the acquired print image together with the error notice to a predetermined information terminal concerning the specified person. In a case where the specified person is absent inside the predetermined area that encompasses the printing apparatus upon the occurrence of an error during printing, a print image showing a print result regarding the print data is transmitted to the information terminal concerning the specified person. Therefore, the printing apparatus of this aspect is capable of notifying the specified person of the occurrence of the error in every case without a failure. In addition, since the print image showing the print result regarding the print data is transmitted, it is easy for the specified person to understand the status of the error.

(2) In the printing apparatus of the above aspect, after the acquisition of the print image, the error notification section may perform color conversion on the print image in accordance with a color space of the information terminal, and may transmit a color-converted image, which is an image after the color conversion, as the transmitted image mentioned above. With the printing apparatus of this mode, it is possible to reproduce the colors of the print image faithfully on the information terminal.

(3) In the printing apparatus of the above aspect, after the acquisition of the print image, the error notification section may cause the printing section to print an image quality check pattern as new print data, may acquire a print image showing a print result regarding the image quality check pattern by using the imaging section, and may transmit both the print image regarding the print data and the print image regarding the image quality check pattern as the transmitted image mentioned above. In a case where the specified person is absent inside the predetermined area that encompasses the printing apparatus upon the occurrence of an error during printing, an image showing a print result regarding the image quality check pattern is transmitted to the information terminal concerning the specified person. Therefore, the printing apparatus of this mode enables the specified person to check the print image showing the print result regarding the print data while referring to the print result regarding the image quality check pattern. This makes it easier to check the print result regarding the print data.

(4) The printing apparatus of another aspect is as follows. The printing apparatus comprises: a printing section that prints out print data onto a medium; an imaging section that captures an image of a print result on the medium; and an error notification section that performs error notification in a case of occurrence of an error during the printing of the print data to a specified person who has been determined in advance. The error notification section judges whether the specified person is absent inside a predetermined area that encompasses the printing apparatus or not. In a case where the specified person is judged to be absent, the error notification section causes the printing section to print an image quality check pattern as new print data, acquires a print image showing a print result regarding the image quality check pattern by using the imaging section, and transmits the acquired print image together with the error notice to a predetermined information terminal concerning the specified person. In a case where the specified person is absent inside the predetermined area that encompasses the printing apparatus upon the occurrence of an error during printing, an image showing a print result regarding the image quality check pattern is transmitted to the information terminal held by the specified person. Therefore, the printing apparatus of this aspect is capable of notifying the specified person of the occurrence of the error in every case without a failure. In addition, the transmission of the image showing the print result regarding the image quality check pattern makes it easier for the specified person to understand the status of the error.

(5) The printing apparatus of the above aspect may further comprise: an apparatus status monitoring section that monitors status of the printing apparatus at predetermined timing that is irrelevant to time of occurrence of the error, wherein the apparatus status monitoring section may judge whether the specified person is absent inside the predetermined area that encompasses the printing apparatus or not, and wherein, in a case where the specified person is judged to be absent, the apparatus status monitoring section may cause the printing section to print an image quality check pattern as new print data, may acquire a print image showing a print result regarding the image quality check pattern by using the imaging section, and may transmit the acquired print image to the predetermined information terminal concerning the specified person. This configuration makes it possible to monitor image quality more frequently.

In addition to an apparatus, the invention can be embodied in various forms. For example, the invention may be embodied as a printing apparatus control method, a non-transitory storage medium storing a computer program, or the like.

BRIEF DESCRIPTION OF THE DRAWINGS

The invention will be described with reference to the accompanying drawings, wherein like numbers reference like elements.

FIG. 4 is a diagram for explaining an example of a dialog box for device registration.

FIG. 5 is a diagram for explaining an example of display when an "environmental setting" tag screen is selected.

DESCRIPTION OF EXEMPLARY EMBODIMENTS

A. First Embodiment

A1. Overall Configuration

Figure 1:
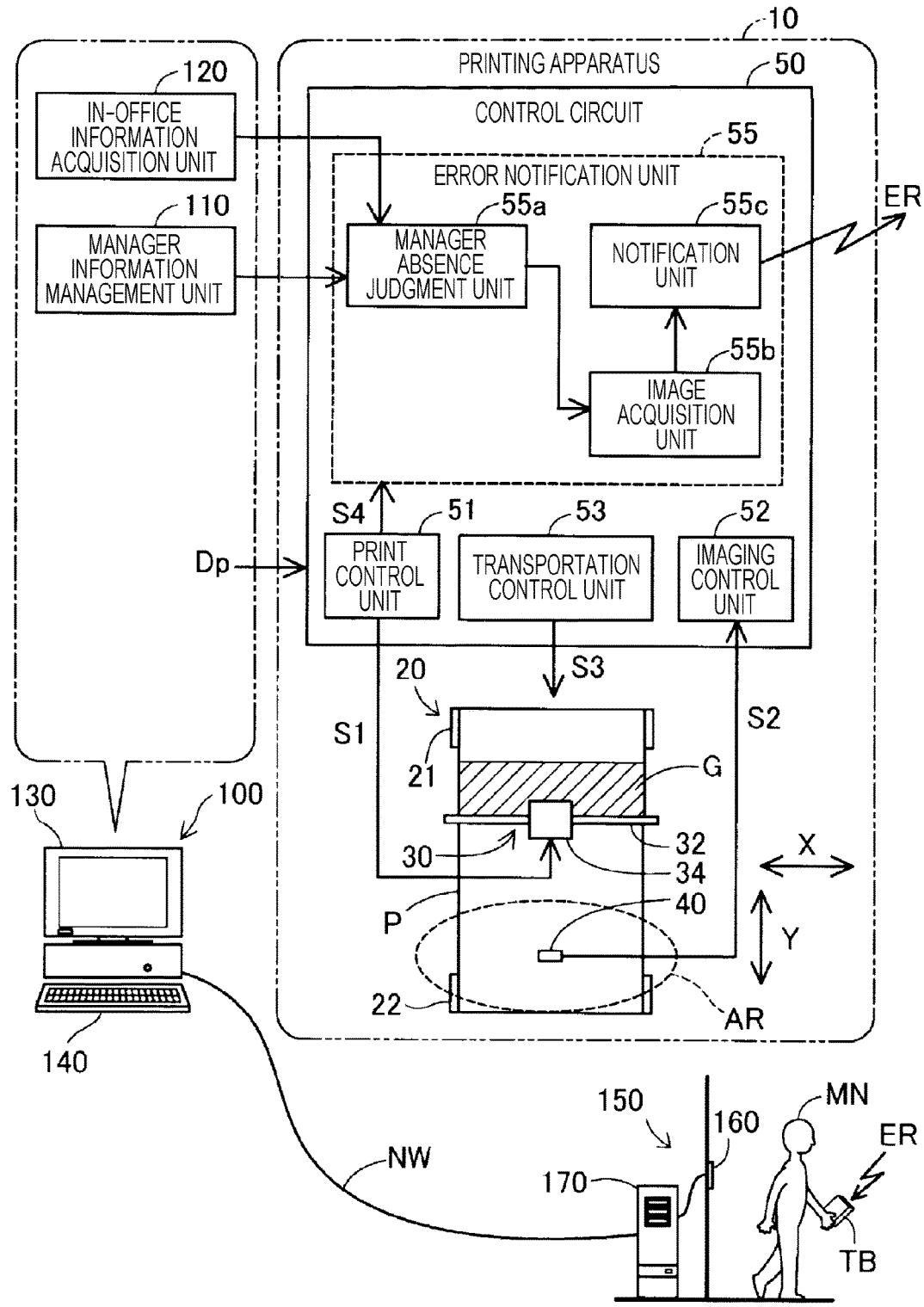
FIG. 1 is a diagram for explaining the configuration of a printing apparatus according to a first embodiment and a peripheral configuration.

FIG. 1 is a diagram for explaining the configuration of a printing apparatus according to a first embodiment and a peripheral configuration. A printing apparatus 10 according to the present embodiment is connected to a computer 100 via an interface that is not illustrated. The printing apparatus 10 is an ink-jet color printer that prints an image on the basis of image data Dp acquired from the computer 100, etc. In the present embodiment, the printing apparatus 10 is a large printer for business use.

In the present embodiment, the printing apparatus 10 and the computer 100 are installed inside a particular facility such as, for example, a company (office), a business office, or the like. An entry/exit management system 150 for managing the entering and exiting of office staff is installed at the entrance/exit of the facility.

The entry/exit management system 150 includes a card reader 160, which is installed near the entrance/exit, and an entry/exit management computer 170, which is connected to the card reader 160. A person who is going to enter or leave the facility holds a non-contact-type IC card in front of the card reader 160 before entry/exit. The entry/exit management computer 170 manages those who are present in the facility by reading the identification code of the person's IC card scanned by the card reader 160. The entry/exit management computer 170 is connected to the computer 100 via a network NW.

The printing apparatus 10 includes a transportation unit 20, which transports a print target medium P, a head unit 30, a camera 40, which captures an image of the result of printing performed by the head unit 30, and a control circuit 50.

In the present embodiment, the print target medium P is roll paper. The transportation unit 20 includes at least two transportation rollers 21 and 22, and transports the print target medium P in a transportation direction. The transportation direction is the same as the length direction of unreeled roll paper.

The head unit 30 includes a guide rail 32, a print head 34, and a reciprocation mechanism (not illustrated). The reciprocation mechanism causes the print head 34 to reciprocate along the guide rail 32. The print head 34 has ink-ejecting nozzles for ink of each of eight colors, which are: yellow (Y), magenta (M), cyan (C), black (BK), light cyan (LC), light magenta (LM), green (GR), and orange (OR). The head unit 30 reciprocates along the guide rail 32 when driven by the reciprocation mechanism (main scan). On the other hand, the print target medium P is moved in the transportation direction by the transportation unit 20. This causes the relative movement of the head unit 30 and the print target medium P (sub scan).

Figure 2:
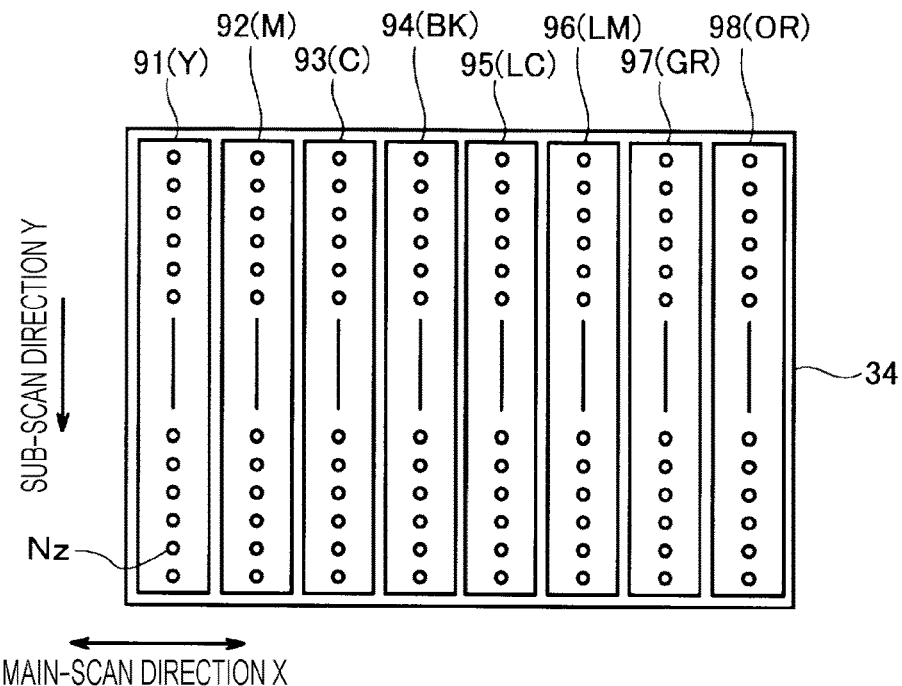
FIG. 2 is a diagram for explaining the arrangement of nozzles in a print head.

FIG. 2 is a diagram for explaining the arrangement of nozzles in the print head 34. The bottom surface of the print head 34 is schematically illustrated. As illustrated therein, the bottom surface of the print head 34, that is, the ink-ejecting surface, has eight nozzle lines 91 to 98, from each of which ink of the corresponding color is ejected. Each of these nozzle lines consists of, for example, three hundred sixty nozzles Nz that are arranged in the sub-scan direction Y at a constant nozzle pitch. The sub-scan direction Y is a direction orthogonal to the main-scan direction X. The eight nozzle lines 91 to 98 are arranged in the main-scan direction X. Specifically, from the left of FIG. 2, they are arranged in the order of: yellow ink nozzle line (Y), magenta ink nozzle line (M), cyan ink nozzle line (C), black ink nozzle line (BK), light cyan ink nozzle line (LC), light magenta ink nozzle line (LM), green ink nozzle line (GR), and orange ink nozzle line (OR). The main-scan direction X is the direction of main scan mentioned above. The sub-scan direction Y is the direction of sub scan mentioned above. The main-scan direction X and the sub-scan direction Y are orthogonal to each other.

An ink chamber (not illustrated) and a piezoelectric element (not illustrated) are provided individually for each of the nozzles Nz. The ink chamber expands and contracts when driven by the piezoelectric element. As a result, an ink droplet is ejected from the nozzle. In the present embodiment, the printing apparatus 10 performs printing by using ink of eight colors. However, the number of the colors of ink used, and color types, may be different from the colors and types described above.

The head unit 30 illustrated in FIG. 1 drives the nozzles Nz of the print head 34 on the basis of print data at appropriate timing in synchronization with main scan and sub scan mentioned above, thereby forming ink dots of appropriate colors at appropriate positions on the print target medium P. In this way, the printing apparatus 10 is capable of printing a color image corresponding to the print data on the print target medium P. The print data is image data generated by the control circuit 50. An explanation of the print data will be given later.

The camera 40 is located downstream of the head unit 30 in the direction in which the print target medium P is transported. The camera 40 captures an image of the print surface of the print target medium P. The broken-line oval AR in FIG. 1 shows an imaging area. As a result of imaging thereat, an image that has been printed on the print target medium P (hereinafter referred to as "print image" where appropriate) is captured by the camera 40. The camera 40 is an RGB camera and performs color imaging.

The control circuit 50 includes a general-purpose computer including a ROM, a RAM, and a CPU. The control circuit 50 further includes non-illustrated dedicated processing circuitry, for example, an AFE (Analog Front End), an image processing chip, and the like. The control circuit 50 controls the overall operation of the printing apparatus 10. The control circuit 50 includes, as its functional blocks embodied by the general-purpose computer and the dedicated processing circuitry, a print control unit 51, an imaging control unit 52, a transportation control unit 53, and an error notification unit 55. The print control unit 51 controls the head unit 30. The imaging control unit 52 controls the camera 40. The transportation control unit 53 controls the transportation unit 20.

In addition, the control circuit 50 includes other various functional units, for example, an input unit (not illustrated) that accepts an operation input from a user, a display control unit (not illustrated) that causes a display to display text and/or an image, and an image processing unit (not illustrated) that performs image processing on image data. The image processing unit generates print data by performing various kinds of image processing on the image data Dp acquired from the computer 100 via the interface. The various kinds of image processing include, for example, color conversion processing of converting original color components (RGB values) into print color components (CMYK values), halftone processing for expressing grayscale values in terms of dot recording density, path decomposition processing of decomposing the image data Dp into pieces corresponding to scan paths of the head unit 30, and data sequence change processing of changing the sequential order of the pieces of data into the order of transfer to the head unit 30.

On the basis of the print data generated by the image processing unit, the print control unit 51 outputs a control signal S1 for controlling the head unit 30. If a print error occurs during the execution of printing of the print data, the print control unit 51 sends print error status S4, which is a signal that indicates the occurrence of the print error and the content of the print error, to the error notification unit 55. The "print error" means a phenomenon that causes a problem in a print image G, or a phenomenon that makes it impossible to continue print processing. Examples of the print error are: nozzle non-ejection (missing dots), meandering/skew, poor image quality caused by the running out of ink or the like, the running out of sheets, a paper jam, waste ink tank "full". In the present embodiment, the head unit 30 and the print control unit 51 constitute a "printing section" according to an aspect of the invention described earlier in "Summary".

The imaging control unit 52 controls the camera 40 and receives an image signal S2, which represents the captured print image G, from the camera 40.

The transportation control unit 53 outputs a drive signal S3 to control the drive motor (not illustrated) of the transportation roller 21, 22.

The error notification unit 55 receives the print error status S4 from the print control unit 51, and transmits the received print error status S4 to a manager MN. The manager MN is a person who was assigned to be in charge of the maintenance and monitoring of the printing apparatus 10. In the present embodiment, the manager MN corresponds to a "specified person" according to an aspect of the invention described earlier in "Summary". As unique functional blocks in the present embodiment, the error notification unit 55 includes a manager absence judgment unit 55a, an image acquisition unit 55b, and a notification unit 55c. These units 55a, 55b, and 55c will be described in detail later.

The computer 100 transmits image data Dp together with a print request to the printing apparatus 10. The computer 100 includes, as its functional blocks, a manager information management unit 110 and an in-office information acquisition unit 120. The manager information management unit 110 manages information on the manager of the printing apparatus 10. The in-office information acquisition unit 120 acquires in-office information from the entry/exit management system 150. The "in-office information" (presence information) is list information on persons who are present in the facility. In this specification, a state in which the person is present in the facility (on the premises) is defined as "in the office", and a state in which the person is not present in the facility (absent) is defined as "not in the office". The manager information managed by the manager information management unit 110 and the in-office information acquired by the in-office information acquisition unit 120 are transmitted to the control circuit 50 of the printing apparatus to be used by the error notification unit 55 of the control circuit 50.

A2. Preparation Processing

The manager information management unit 110 of the computer 100 stores information on the manager of the printing apparatus 10. In the present embodiment, it is possible to register information on a single person as the manager of the printing apparatus 10. A user operates an input device 140 to input the manager information via a dialog box displayed on a display 130 of the computer 100.

Figure 3:
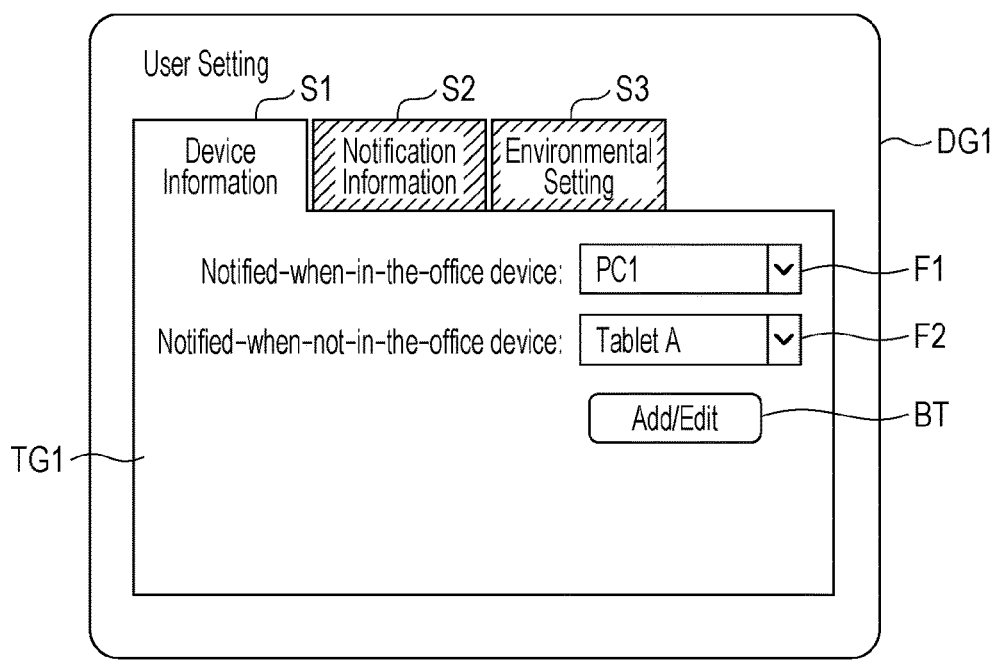
FIG. 3 is a diagram for explaining an example of a dialog box for inputting manager information.

FIG. 3 is a diagram for explaining an example of a dialog box DG1 for inputting manager information. The dialog box DG1 includes three tag screens, specifically, a tag screen for "device information", a tag screen for "notification information", and a tag screen for "environmental setting".

The "device information" tag screen TG1 is a screen for setting devices the user of which is the manager. The device information tag screen TG1 includes a "notified-when-in-the-office device" input field F1 and a "notified-when-not-in-the-office device" input field F2. The "notified-when-in-the-office device" input field F1 is an input field for entering the model name of a communication device with which it is possible to communicate when the manager is in the office. The "notified-when-not-in-the-office device" input field F2 is an input field for entering the model name of a mobile terminal with which it is possible to communicate when the manager is not in the office. The mobile terminal is, for example, a small notebook computer, a smartphone, a tablet terminal, or the like. In the illustrated example, the entry in the "notified-when-in-the-office device" input field F1 is "PC1", which is a personal computer, and the entry in the "notified-when-not-in-the-office device" input field F2 is "Tablet A", which is a tablet TB (FIG. 1). Each of these inputs is made by selecting one from among plural device candidates. The candidate devices have been registered in advance. A user can add a new candidate to, or edit, them by operating the "add/edit" button BT.

FIG. 4 is a diagram for explaining an example of a dialog box DG2 for device registration. Via the dialog box DG2, a user can set the "device name", "maximum resolution", "network environment", "profile information", and "mail address" of a candidate device that the user is going to add.

FIG. 5 is a diagram for explaining an example of display when the "environmental setting" tag screen TG3 is selected in the manager information inputting dialog box DG1. The tag screen TG3 includes a "cloud use" input field F3 and an "image attachment" input field F4. The "cloud use" input field F3 is an input field for entering whether the manager is a cloud user or not. The "image attachment" input field F4 is an input field for entering a limit of data volume for an image attached to an error notice.

A3. Print Processing

Figure 6:
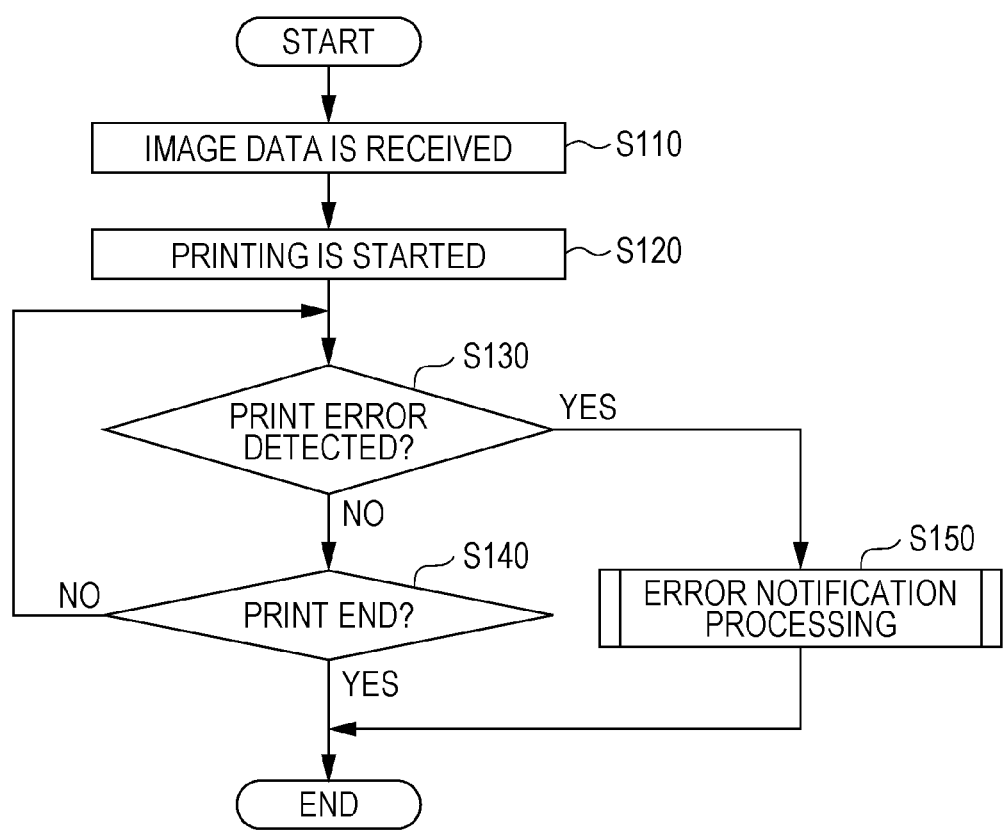
FIG. 6 is a flowchart that illustrates print processing.

FIG. 6 is a flowchart that illustrates print processing performed by a printing apparatus according to the first embodiment. The illustrated print processing is performed when a print request is received from the outside, that is, from the computer 100, at the control circuit 50 of the printing apparatus 10. When the processing is started, the control circuit 50 receives the image data Dp sent together with the print request (step S110). Next, the control circuit 50 starts the printing of the image data Dp (step S120). While performing the aforementioned processing of generating print data from the image data Dp, the control circuit 50 prints the print data.

Next, the control circuit 50 judges whether a print error is detected during the printing of the print data or not (step S130). Specifically, the control circuit 50 judges that a print error has been detected in a case where the print error status S4 is received from the print control unit 51. If it is judged in this step that no print error has been detected, the process proceeds to a step S140. In the step S140, the control circuit 50 judges whether the printing of the image data Dp has ended or not. If it is judged in this step that the printing has not ended, the process returns to the step S130, and the printing continues.

If it is judged in the step S130 that a print error has been detected, the process proceeds to a step S150. Then, error notification processing is performed (step S150). After that, the print processing ends. If it is judged in the step S140 that the printing has ended without print error detection, the control circuit 50 terminates the print processing immediately.

Figure 7:
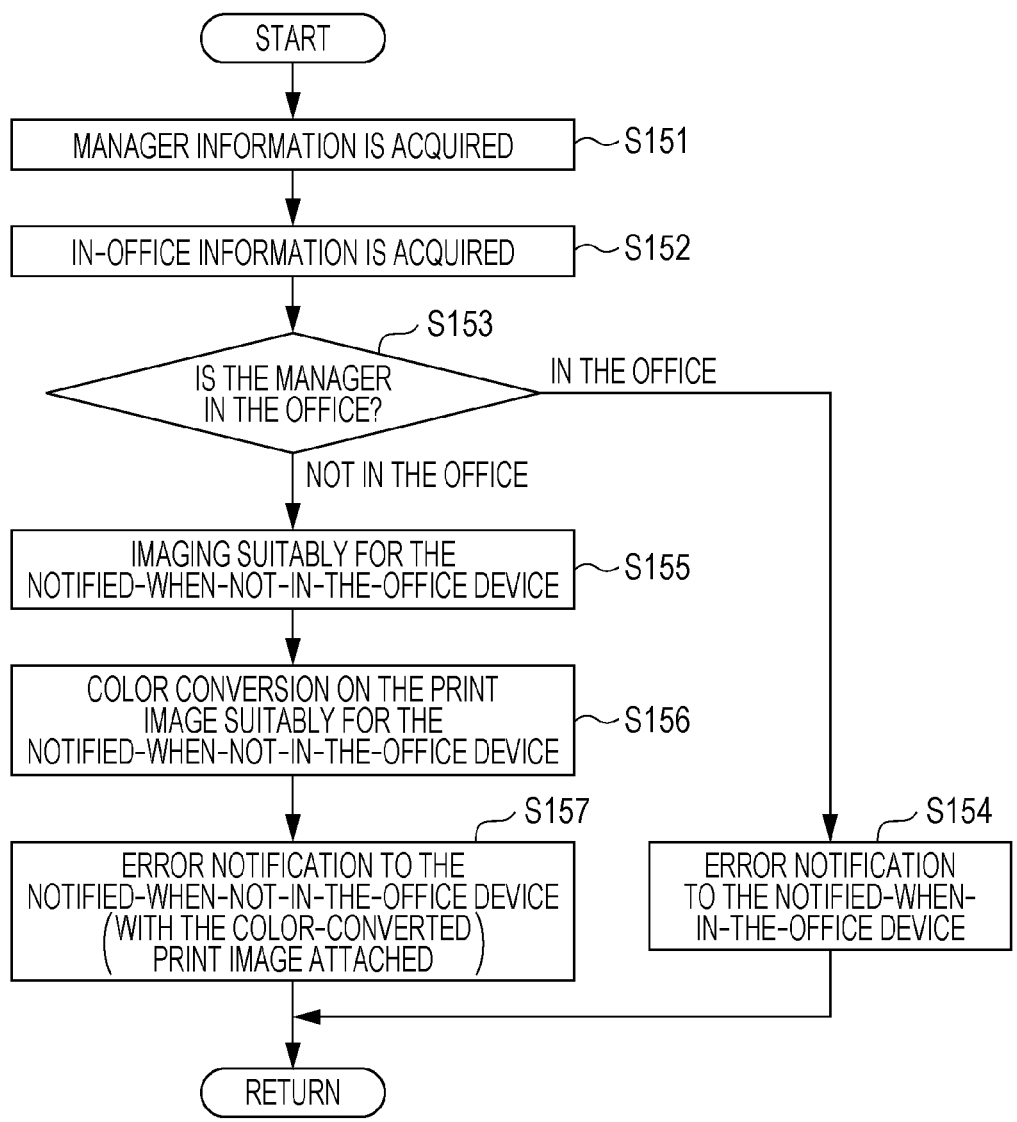
FIG. 7 is a flowchart that illustrates error notification processing performed in a step S150 of FIG. 6 in detail.

FIG. 7 is a flowchart that illustrates error notification processing performed in the step S150 in detail. When the processing is started, the control circuit 50 acquires manager information from the manager information management unit 110 of the computer 100 (step S151) and acquires in-office information from the in-office information acquisition unit 120 of the computer 100 (step S152). Next, on the basis of the acquired manager information and the acquired in-office information, it is judged whether the manager is in the office or not (step S153). Specifically, the control circuit 50 judges whether the manager is not present in the facility (absent, not in the office) or is present in the facility (in the office) by collating the manager in the manager information with the in-office information. The processing from the step S151 to the step S153 functions as the manager absence judgment unit 55a illustrated in FIG. 1.

If it is judged in the step S153 that the manager MN is in the office, the control circuit 50 notifies the notified-when-in-the-office device of a print error (step S154). Specifically, if it is judged that the manager is in the office, the control circuit transmits a notification of the occurrence of a print error to the device set in the "notified-when-in-the-office device" input field F1 of the "device information" tag screen TG1 illustrated in FIG. 3. More specifically, the notification is transmitted in the form of an e-mail to the registered "e-mail address". After that, the process exits from the error notification processing, and the control circuit 50 terminates the print processing illustrated in FIG. 6.

If it is judged in the step S153 that the manager MN is not in the office, the control circuit 50 controls the camera 40 via the imaging control unit 52 for performing imaging in such a way as to be suitable for the notified-when-not-in-the-office device hand-held by the manager (step S155). Specifically, the imaging is performed in accordance with the resolution of the device set in the "notified-when-not-in-the-office device" input field F2 of the "device information" tag screen TG1 illustrated in FIG. 3. The resolution of the device in the input field F2 has been set via the device registration dialog box DG2 illustrated in FIG. 4. In the example illustrated in FIG. 4, the imaging is performed at resolution of 1,920×1,200 [dpi]. By this means, it is possible to properly manage the amount of use of the memory and hard disk drive of the printing apparatus 10 in accordance with the resolution of the notified-when-not-in-the-office device. As the result of the imaging in the step S155, the control circuit 50 can acquire the print image G on the print target medium P from the camera 40 via the imaging control unit 52. The processing in the step S155 functions as the image acquisition unit 55b illustrated in FIG. 1.

After the execution of the step S155, the control circuit 50 performs color conversion processing on the print image G acquired in the step S155 in accordance with the color space of the notified-when-not-in-the-office device (step S156). In the present embodiment, the color profile (ICC profile) of the notified-when-not-in-the-office device has been set via the device registration dialog box DG2 illustrated in FIG. 4. Therefore, the color conversion is performed in accordance with the set color profile.

Next, the control circuit 50 notifies the notified-when-not-in-the-office device of a print error (step S157). As described earlier, the notified-when-not-in-the-office device is the device set in the "notified-when-not-in-the-office device" input field F2 illustrated in FIG. 3. Specifically, the processing in the step S157 is performed by transmitting, together with the notification of the occurrence of the print error, the color-converted print image after the conversion processing in the step S156. That is, the notification is transmitted in the form of an e-mail to the registered "e-mail address", with the print image attached to the e-mail. The processing in the step S157 functions as the notification unit 55c illustrated in FIG. 1.

After the execution of the step S157, the process exits from the error notification processing, and the control circuit 50 terminates the print processing illustrated in FIG. 6. If a next print request for performing next printing after the end of the above print processing has been received, the processing of the instructed printing is started.

A4. Effects of Embodiment

As explained in detail above, the printing apparatus 10 according to the first embodiment notifies the notified-when-in-the-office device of a print error in a case where the manager is in the office at the time of the occurrence of the print error, or notifies the notified-when-not-in-the-office device of a print error in a case where the manager is not in the office at the time of the occurrence of the print error. In particular, if the manager is not in the office, a print image showing the result of printing is captured by means of the camera 40, and the captured print image is transmitted together with the error notification to the notified-when-not-in-the-office device. Therefore, the printing apparatus 10 according to the first embodiment is capable of notifying the manager of the occurrence of the print error in every case without a failure. Moreover, the manager is able to see the print image showing the result of printing even when not in the office. This enables the manager to grasp the status of the error even when not in the office.

In the present embodiment, a print image acquired by image-capturing the result of printing undergoes color conversion in accordance with the color space of the notified-when-not-in-the-office device. This ensures faithful color reproduction of the print image on the screen of the notified-when-not-in-the-office device. Therefore, the manager is able to grasp the status of the error accurately.

B. Second Embodiment

Figure 8:
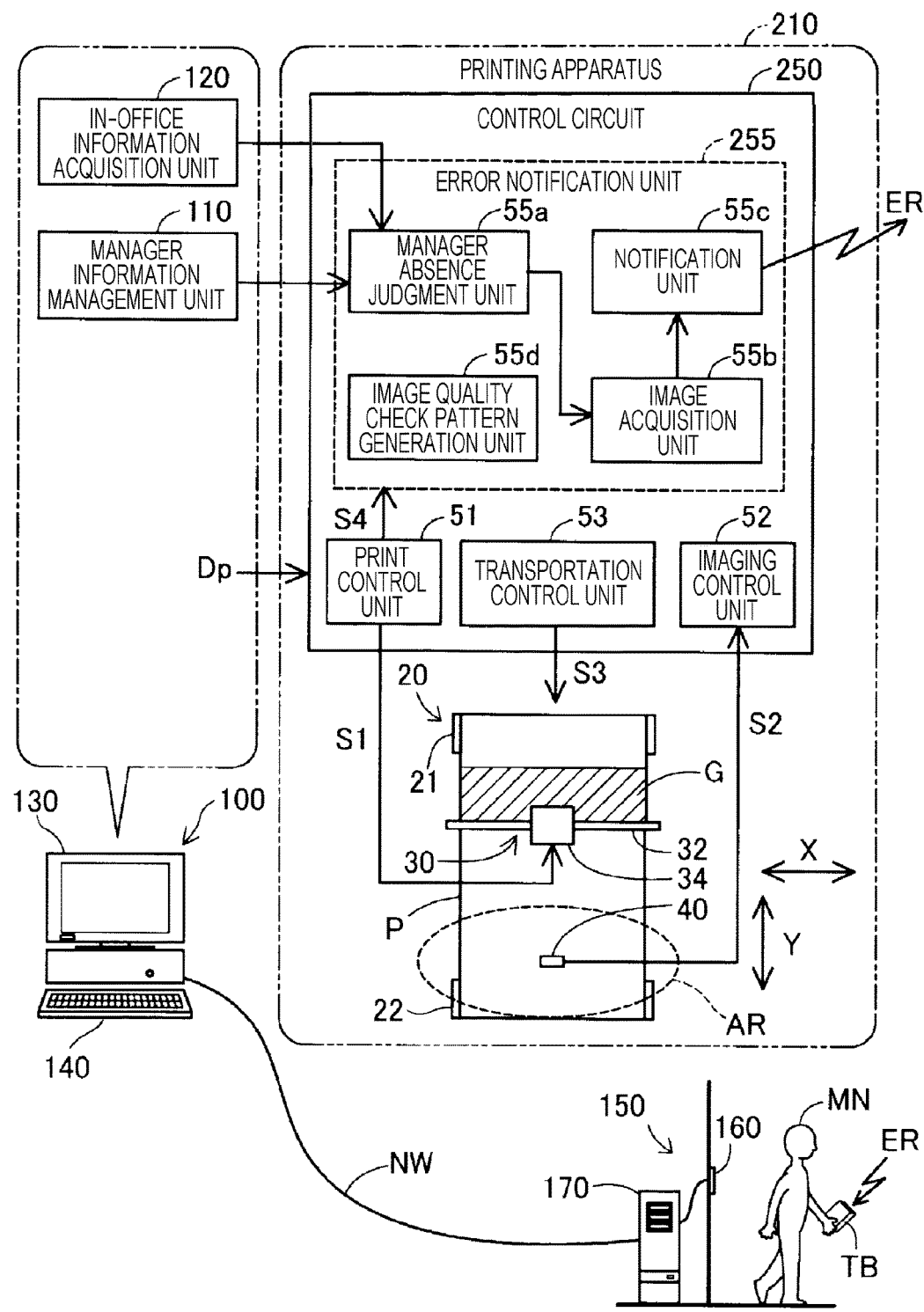
FIG. 8 is a diagram for explaining the configuration of a printing apparatus according to a second embodiment and a peripheral configuration.

FIG. 8 is a diagram for explaining the configuration of a printing apparatus according to a second embodiment and a peripheral configuration. A printing apparatus 210 according to a second embodiment is the same as the printing apparatus 10 according to the first embodiment except that the configuration of an error notification unit 255 of a control circuit 50 is different. The error notification unit 255 includes an image quality check pattern generation unit 55d. In this respect, the error notification unit 255 is different from the error notification unit 55 according to the first embodiment.

Figure 9:
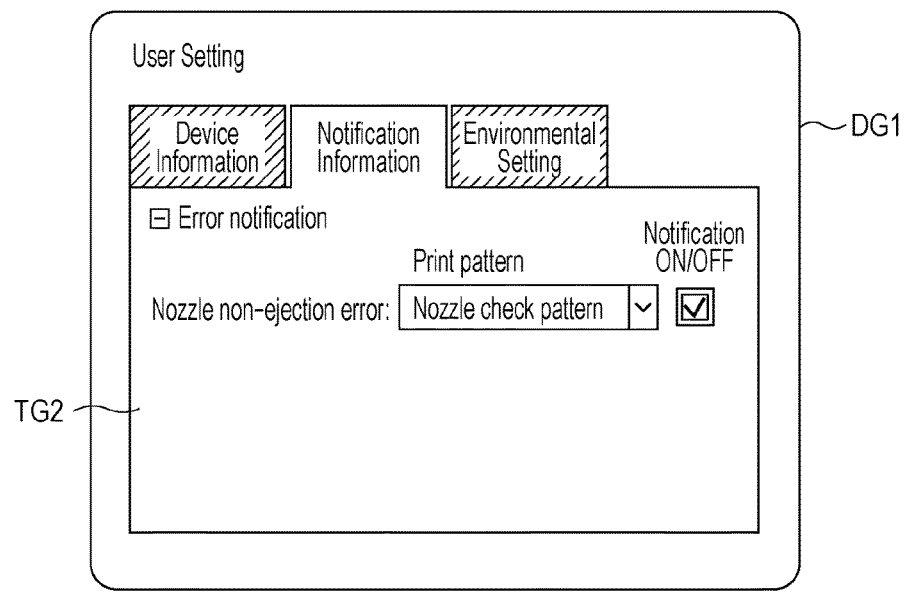
FIG. 9 is a diagram for explaining an example of display when a "notification information" tag screen is selected in the manager information inputting dialog box.

FIG. 9 is a diagram for explaining an example of display when the "notification information" tag screen TG2 is selected in the manager information inputting dialog box DG1. Though a similar "notification information" tag screen is included in the first embodiment, it is impossible in the first embodiment to switch to the "notification information" tag screen because it is unnecessary. In contrast, in the second embodiment, it is possible to switch to the "notification information" tag screen TG2 illustrated in FIG. 9. It is possible to set a print pattern on a nozzle non-ejection error on the tag screen TG2. "Nozzle non-ejection" is a state in which no ink droplet is ejected from the nozzle Nz (FIG. 2) though the piezoelectric element has been driven for ink ejection.

The image quality check pattern generation unit 55d (FIG. 8) generates, as a pattern for checking image quality, a print pattern set regarding a nozzle non-ejection error on the "notification information" tag screen TG2 (FIG. 9).

Figure 10:
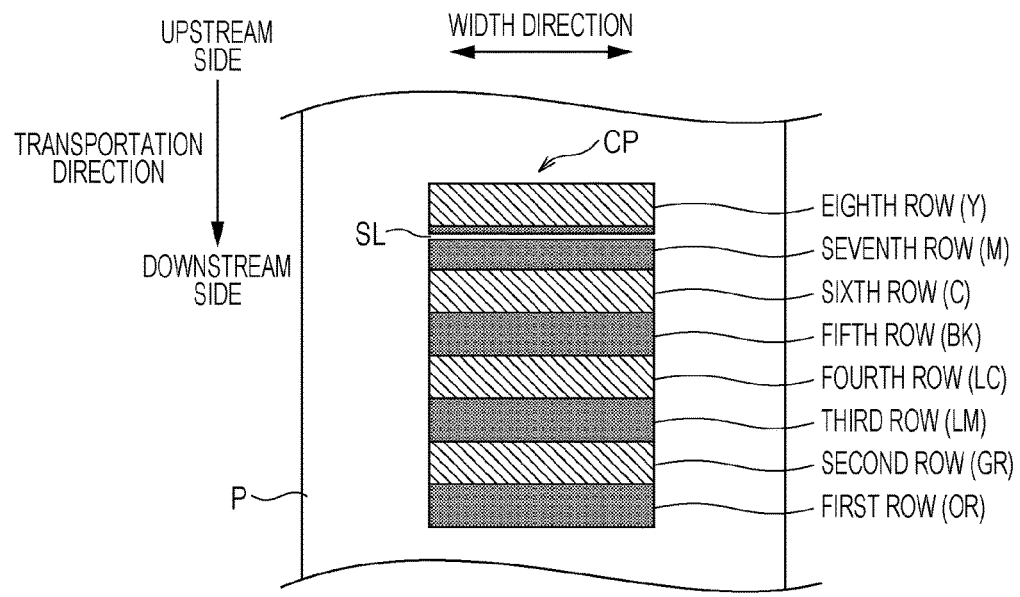
FIG. 10 is a diagram for explaining an example of an image quality check pattern generated by an image quality check pattern generation unit.

FIG. 10 is a diagram for explaining an example of an image quality check pattern generated by an image quality check pattern generation unit 55d. An image quality check pattern CP is generated by ejecting ink from ink-ejecting nozzles of all colors. Color-stripe areas are arranged with adjacency in the transportation direction (sub-scan direction). These areas (color pattern) are made up of first to eighth rows corresponding to print colors, which are: OR, GR, LM, LC, C, M, and Y. For example, as illustrated in FIG. 10, a paper-color slit SL, which is elongated in the width direction, is produced at a predetermined position in the sub-scan direction in the area of the seventh row, that is, the row of magenta (M), if nozzle non-ejection occurs in a part of ink-ejecting nozzles for magenta (M). The illustrated image quality check pattern CP is a so-called "nozzle check pattern" (refer to FIG. 9). However, it is not limited to a nozzle check pattern. It may be other print pattern called as, for example, a "color-limited check pattern" or a "density check pattern".

The "color-limited check pattern" will be described later as a variation example of the second embodiment. The "density check pattern" is a pattern in which density is changed on a color-by-color basis (for example, 50% and 100%).

Figure 11:
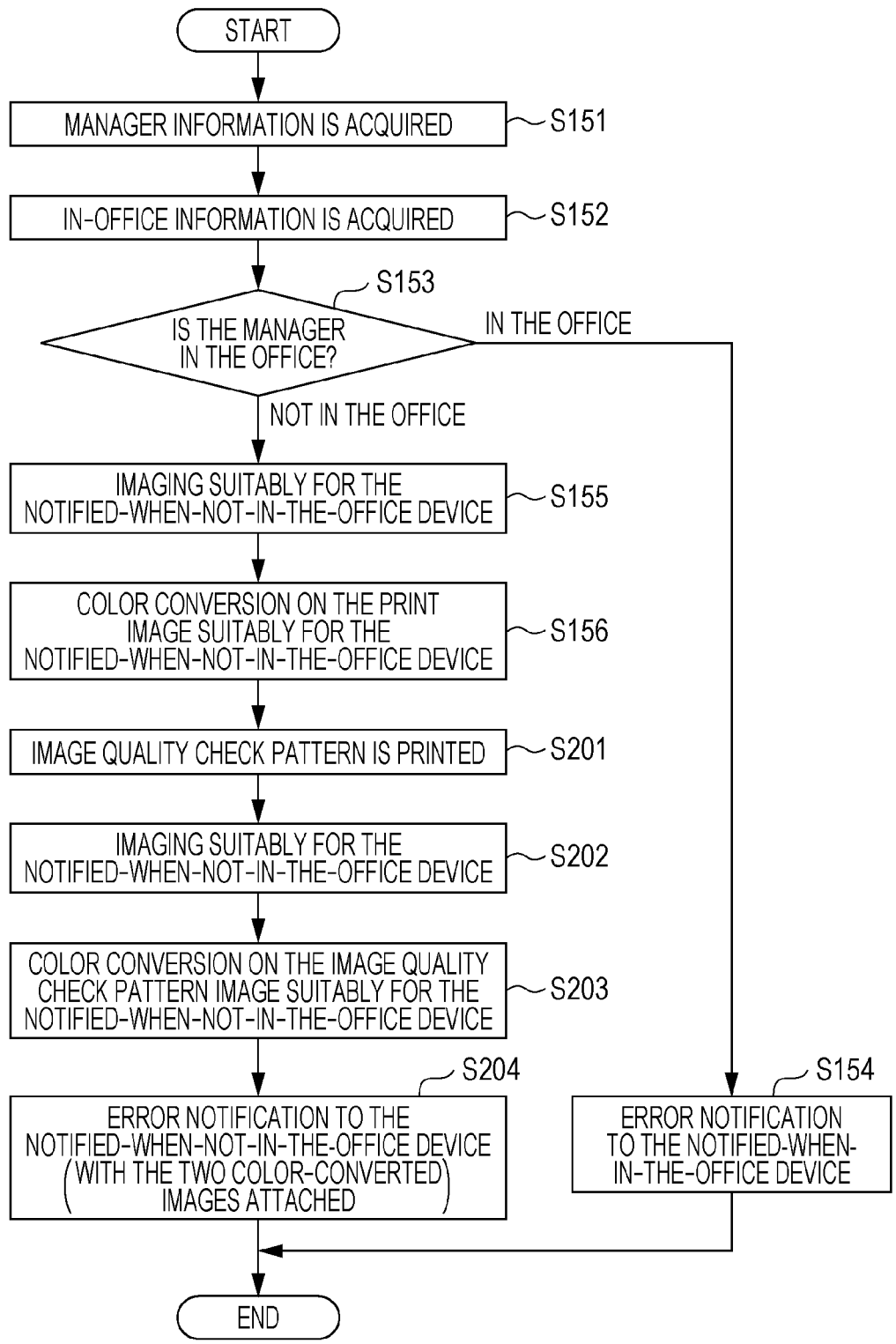
FIG. 11 is a flowchart that illustrates error notification processing according to a second embodiment.

FIG. 11 is a flowchart that illustrates error notification processing performed by a printing apparatus according to the second embodiment. The routine of print processing performed by a printing apparatus according to the second embodiment is the same as the routine of print processing according to the first embodiment illustrated in FIG. 6, and the content of error notification processing performed in the step S150 only differs. The error notification processing of the present embodiment is illustrated in FIG. 11.

Processing from a step S151 to a step S156 of the error notification processing illustrated in FIG. 11 is the same as that of the error notification processing according to the first embodiment. The difference therebetween lies in processing from a step S201 to a step S204. After the execution of the step S156, the control circuit 250 prints the image quality check pattern CP generated by the image quality check pattern generation unit 55d. Specifically, print data is generated from the image quality check pattern CP, and the generated print data is printed out.

Next, the control circuit 250 controls the camera 40 via the imaging control unit 52 for performing imaging in such a way as to be suitable for the notified-when-not-in-the-office device hand-held by the manager (step S202). This processing is the same as that of the step S155 except that the target of imaging is the image quality check pattern CP printed in the step S201 instead of the print image G.

Next, the control circuit 250 performs color conversion processing on the image of the image quality check pattern CP, which has been acquired as the result of imaging in the step S202, in accordance with the color space of the notified-when-not-in-the-office device (step S203). This color conversion is performed in accordance with the color profile of the notified-when-not-in-the-office device similarly to the step S156.

Next, the control circuit 250 notifies the notified-when-not-in-the-office device of a print error (step S204). Specifically, the color-converted print image after the conversion processing in the step S156 and the color-converted image quality check pattern image after the conversion processing in the step S203 are transmitted together with the notification of the occurrence of the print error. That is, the notification is transmitted in the form of an e-mail to the registered "e-mail address", with the print image and the image quality check pattern image attached to the e-mail. After the execution of the step S204, the process exits from the error notification processing, and the control circuit 250 terminates the print processing illustrated in FIG. 11.

The printing apparatus 210 according to the second embodiment, which has the configuration described above, enables the manager to grasp the status of the error even when not in the office, similarly to the effect of the printing apparatus 10 according to the first embodiment. The present embodiment enables the manager to check the print image G while referring to the image of the image quality check pattern CP. Therefore, it is possible to easily judge whether the print image G can be used as it is or not. For example, in the example illustrated in FIG. 10, it is the area of magenta (M) where nozzle non-ejection occurred and, therefore, it is possible to judge that there is no problem in the print image G if no magenta is used in the print image G. This reduces the occurrences of a print failure and realizes the efficient use of resources.

C. Variation Example of Second Embodiment

First Variation Example of Second Embodiment

In the printing apparatus according to the second embodiment, the pattern of a set of colors is printed as the image quality check pattern CP, and, after the image-capturing of the printed pattern, the captured image is sent to the notified-when-not-in-the-office device. As a variation example of the embodiment, the pattern of only a color in which nozzle non-ejection occurred, specifically, the pattern of only magenta (M) in the seventh row in the example illustrated in FIG. 10, may be printed, and, after the image-capturing of the printed pattern, the captured image may be sent to the notified-when-not-in-the-office device. The print control unit 51 (FIG. 1) knows the position of the clogged nozzle. This information is sent as a part of the print error status S4 to the control circuit 250. Therefore, the control circuit 250 can transmit, to the notified-when-not-in-the-office device, the pattern of only the color in which nozzle non-ejection occurred. The pattern of the color in which nozzle non-ejection occurred is the "color-limited check pattern". This configuration enables the manager to quickly check the pattern of only the color in which nozzle non-ejection occurred. Therefore, it offers excellent workability.

Second Variation Example of Second Embodiment

As another variation example, the second embodiment may be modified as follows. In a case where the print head 34 is made up of a plurality of print heads (hereinafter referred to as "print head cell"), only the part that is relevant to the print head cell in which nozzle non-ejection occurred is clipped, and the clipped part is transmitted to the notified-when-not-in-the-office device.

Third Variation Example of Second Embodiment

As another variation example, the second embodiment may be modified as follows. An image of the part printed by the nozzle-non-ejection print head cell is extracted from the print image obtained as the result of the step S156 in FIG. 11. The clipped image according to the second variation example of the second embodiment is synthesized with, and next to, the extracted image. Then, color conversion processing is performed on the image obtained as the result of the synthesis (hereinafter referred to as "synthesis image") in accordance with the color space of the notified-when-not-in-the-office device. After the color conversion, the synthesis image is transmitted to the notified-when-not-in-the-office device.

Figure 12:
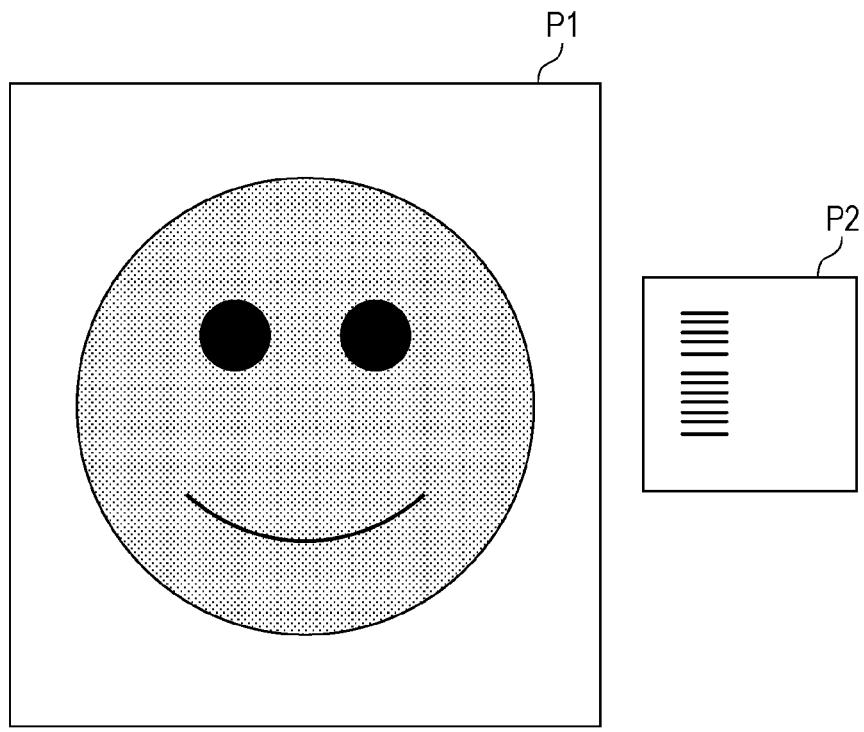
FIG. 12 is a diagram for explaining an example of a color-converted synthesis image displayed on the notified-when-not-in-the-office device of the manager.

FIG. 12 is a diagram for explaining an example of the color-converted synthesis image displayed on the notified-when-not-in-the-office device of the manager. In FIG. 12, P1 denotes a print image printed by a print head cell in which nozzle non-ejection occurred. For example, it corresponds to magenta in the example illustrated in FIG. 10. In FIG. 12, P2 denotes an image obtained by clipping, from the color-limited pattern area, only the part that is relevant to the print head cell in which nozzle non-ejection occurred. By comparing the image P1 with the image P2, the manager can easily check where there is a problem in the result of printing.

Fourth Variation Example of Second Embodiment

As another variation example of the second embodiment, the steps S155 and S156 of FIG. 11 may be omitted, and the color-converted image quality check pattern image only, which is obtained in the step S203, may be transmitted together with the notification of the occurrence of the print error.

D. Third Embodiment

Figure 13:
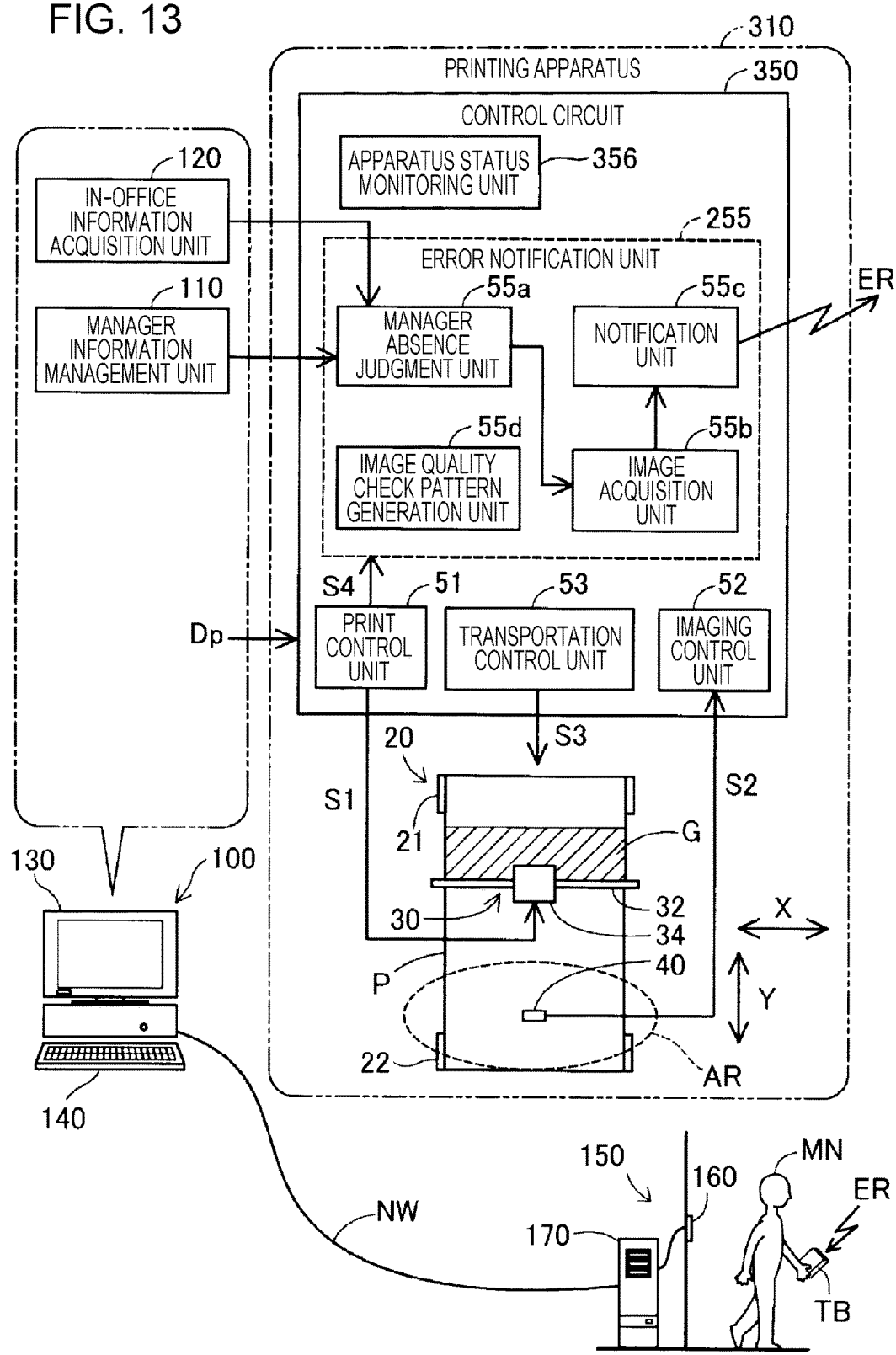
FIG. 13 is a diagram for explaining the configuration of a printing apparatus according to a third embodiment and a peripheral configuration.

FIG. 13 is a diagram for explaining the configuration of a printing apparatus according to a third embodiment and a peripheral configuration. A printing apparatus 310 according to a third embodiment is the same as the printing apparatus 210 according to the second embodiment except that the configuration of a control circuit 350 is different. The control circuit 350 includes an apparatus status monitoring unit 356 in addition to the same components as those of the control circuit 250 according to the second embodiment.

The apparatus status monitoring unit 356 monitors the status of the printing apparatus 310 at predetermined timing that is irrelevant to the time of occurrence of a print error. In the present embodiment, the "predetermined timing" is either before job printing or after job printing, or both.

Figure 14:
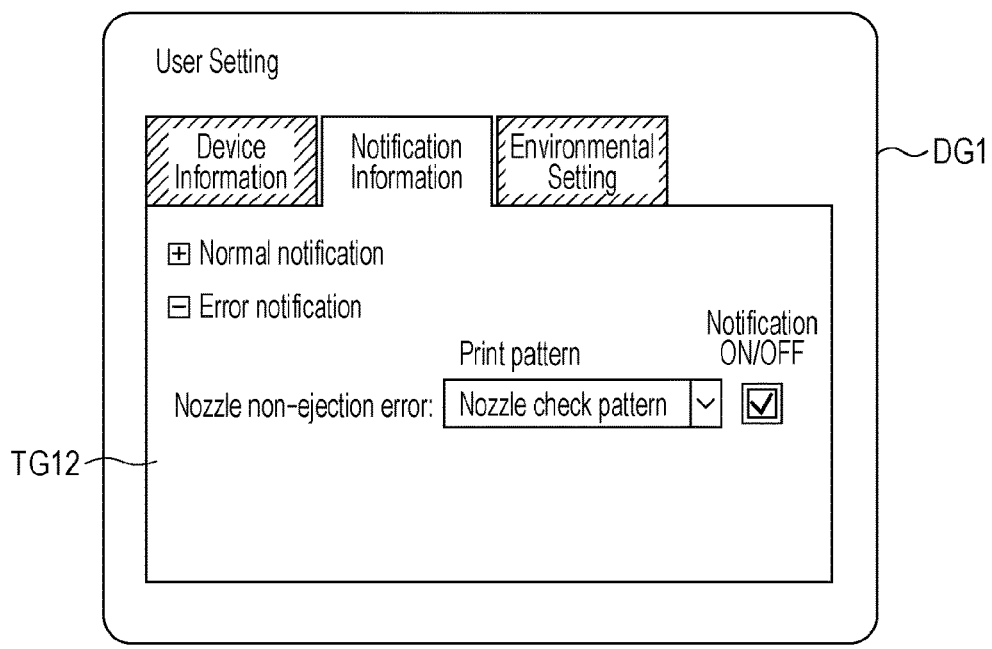
FIG. 14 is a diagram for explaining an example of display when a "notification information" tag screen is selected.

FIG. 14 is a diagram for explaining an example of display when a "notification information" tag screen TG12 is selected in the manager information inputting dialog box DG1. Though a similar "notification information" tag screen TG2 (FIG. 9) is included in the second embodiment, the tag screen TG2 includes no option other than "error notification". In contrast, as illustrated in FIG. 14, there are two options in the "notification information" tag screen TG12 according to the third embodiment: "normal notification" and "error notification". If the option "error notification" is selected, it is possible to set a print pattern on a nozzle non-ejection error, as in the second embodiment.

Figure 15:
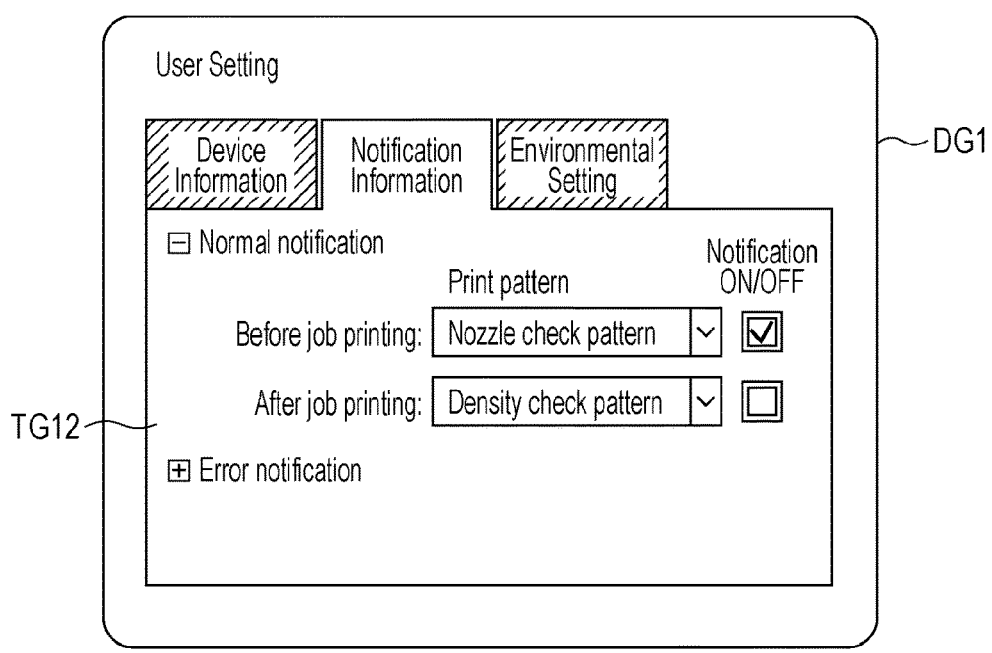
FIG. 15 is a diagram for explaining an example of display when an option "normal notification" is selected on the "notification information" tag screen.

FIG. 15 is a diagram for explaining an example of display when the option "normal notification" is selected on the "notification information" tag screen TG12. If the option "normal notification" is selected, it is possible to set a printer pattern for "before job printing" and a printer pattern for "after job printing". Moreover, for "before job printing" and for "after job printing" each, it is possible to specify whether to issue a notice or not by checking or unchecking the checkbox. In the illustrated example, the checkbox before job printing is ON.

The apparatus status monitoring unit 356 monitors the status of the printing apparatus 310 at the notification timing specified via the tag screen TG12 of FIG. 15. Specifically, the status of the printing apparatus 310 is monitored at the timing indicated by checkbox ON, specifically, before job printing in the example illustrated in FIG. 15.

Figure 16:
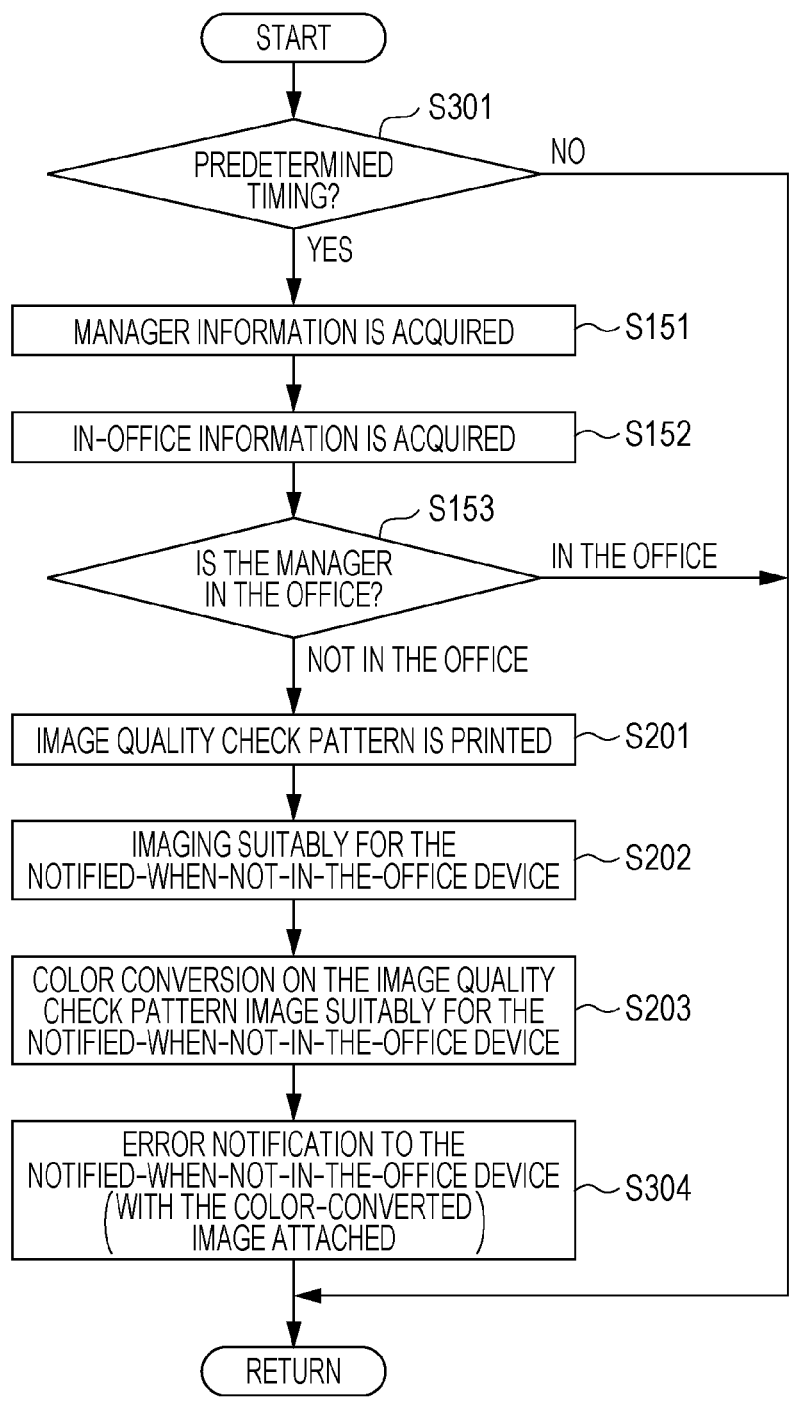
FIG. 16 is a flowchart that illustrates status monitoring processing.

FIG. 16 is a flowchart that illustrates status monitoring processing performed at the control circuit 350. The status monitoring processing realizes the apparatus status monitoring unit 356. The status monitoring processing is repeated at predetermined time intervals. Upon the start of processing, the control circuit 350 judges whether it has reached predetermined timing or not (step S301). The predetermined timing is the timing set via the screen illustrated in FIG. 15. The status monitoring processing ends if it is judged that it has not reached the predetermined timing yet.

If YES in the step S301, the steps S151, S152, S153, S201, and S203 in error notification processing according to the second embodiment (FIG. 11) are executed sequentially in this order. However, the image quality check pattern printed in the step S201 is the print pattern set via the screen illustrated in FIG. 15.

After the execution of the step S203, the control circuit notifies the notified-when-not-in-the-office device of a print error (step S304). Specifically, the color-converted image quality check pattern image after the conversion processing in the step S203 is transmitted together with the notification of the occurrence of the print error. That is, the notification is transmitted in the form of an e-mail to the registered "e-mail address", with the image quality check pattern image attached to the e-mail. After the execution of the step S304, the control circuit 250 terminates the error notification processing.

The printing apparatus 310 according to the third embodiment, which has the configuration described above, enables the manager to grasp the status of the error even when not in the office, similarly to the effect of the printing apparatus 10 according to the first embodiment. Moreover, the printing apparatus 310 according to the third embodiment enables the manager to check the print image G while referring to the image of the image quality check pattern CP at predetermined timing that is irrelevant to the time of occurrence of a print error. This enables the manager to monitor image quality more frequently.

Though it is explained above that the printing apparatus 310 according to the third embodiment includes the apparatus status monitoring unit 356 in addition to the same components as those of the printing apparatus 210 according to the second embodiment, the printing apparatus 310 may include the apparatus status monitoring unit 356 in addition to the same components as those of the printing apparatus 10 according to the first embodiment.

E. Modification Examples

First Modification Example

In each of the foregoing embodiments and each of the foregoing variation examples, a predetermined area that encompasses a printing apparatus is assumed to be a facility in which the printing apparatus is provided, and it is judged whether the specified person is absent inside the predetermined area or not. In a modification example, the "predetermined area that encompasses a printing apparatus" may be a room in which the printing apparatus is provided. That is, any area, excluding extreme proximity to the printing apparatus, may be set as the "predetermined area that encompasses a printing apparatus."

Second Modification Example

In each of the foregoing embodiments and each of the variation examples, an entry/exit management system using a non-contact-type IC card judges whether the manager is absent or not. In a modification example, it may be judged whether the manager is present inside the predetermined area or not by using a time card system, the login information of the personal computer of the manager in the facility, video captured by a monitoring camera in the facility, a sensor that detects the approaching of a person (for example, iBeacon®), or the like.

Third Modification Example

In each of the foregoing embodiments and each of the variation examples, print processing is terminated after error notification (including image attachment) when the specified person is absent. The next job is executed upon the termination. Instead of the foregoing configuration, the operation of the printing apparatus may be stopped, and an instruction from the manager for print error recovery processing (for example, flushing) may be waited for.

Fourth Modification Example

In each of the foregoing embodiments and each of the variation examples, the processing of error notification (including image attachment) at the time of absence of the specified person is performed just once. However, the notification processing may be performed more than once. The notification processing may be repeated until receiving an instruction from the manager. A transmission image may be generated with consideration for elapsed time. For example, the print result may be image-captured every 10 minutes from the start of printing, and images may be arranged and notified to the user after the end of printing.

Fifth Modification Example

In each of the foregoing embodiments and each of the variation examples, the "specified person" is a manager who was assigned to be in charge of the maintenance and monitoring of a printing apparatus. However, the "specified person" is not limited to a manager. The "specified person" may be anyone who is capable of troubleshooting a print error. The image captured may vary depending on the skill/knowledge level of the specified person. For example, in a case of a service supporter or an advanced user, the notification may be performed to enable him/her to check not only the non-ejection of a particular nozzle but also the entirety. It is difficult for a beginner to make a judgment by looking at various patterns. Therefore, in the second embodiment, in a case of a beginner, it is all right to capture the print image G only.

Sixth Modification Example

In each of the foregoing embodiments and each of the variation examples, image transmission to the notified-when-not-in-the-office device is performed in the form of an e-mail. However, other communication means may be used for image transmission instead. For example, an image may be uploaded to a cloud that is accessible to the notified-when-not-in-the-office device. In such a case, it is not always necessary that image resolution should be in accordance with the resolution of the notified-when-not-in-the-office device. Imaging may be performed at the maximum imaging resolution of a camera. In each of the foregoing embodiments involving image transmission to the notified-when-not-in-the-office device, imaging may be performed under predetermined imaging conditions without setting it to be suitable for the notified-when-not-in-the-office device.

Seventh Modification Example

In each of the foregoing embodiments and each of the variation examples, a print error is outputted from the print control unit 51. However, it may be outputted from the entire printing apparatus including the transportation control unit. Print errors may include so-called "warning", which is lower in error level. Moreover, it may be configured that the manager is able to set which levels of problems should be included in print errors.

Eighth Modification Example

In the third embodiment and the variation example thereof, the "predetermined timing" at which the apparatus status monitoring unit 356 performs processing is either before job printing or after job printing, or both. Some modification examples are: the timing of a periodic maintenance, the timing of completion of a specified print length, the timing of lapse of specified print time, and the like.

Ninth Modification Example

In each of the foregoing embodiments and each of the variation examples, a printing apparatus according to the invention is embodied as a printer (printing apparatus 10, 210, 310). However, a printing apparatus according to the invention may be embodied as a combination of the computer 100 and a printer, with transfer of a part of the functions of the control circuit 50, 250, 350 to the computer 100.

Tenth Modification Example

The processing performed when the manager is not in the office in each of the foregoing embodiments and each of the variation examples may be performed not only when s/he is not in the office but also when s/he is in the office, and a print image and an image quality check pattern may be transmitted to the notified-when-in-the-office device when s/he is in the office.

Eleventh Modification Example

In each of the foregoing embodiments and each of the variation examples, an image is captured by the camera 40 under the control of the imaging control unit 52 if the manager is not in the office in error notification processing. In a modification example, the imaging control unit 52 may cause the camera 40 to perform imaging always when printing starts, and the captured image may be acquired if the manager is not in the office in error notification processing.

Twelfth Modification Example

It is explained in the embodiment that the information terminal with which it is possible to communicate when the manager is not in the office is a compact light-weight mobile terminal that can be carried, for example, a small notebook computer, a smartphone, a tablet terminal, or the like. In a modification example, it may be other information terminal such as a terminal installed at a particular fixed position.

The scope of the invention is not limited to the foregoing embodiments and variation/modification examples. The invention may be modified in various ways within a range of not departing from its spirit. For example, technical features in embodiments and variation/modification examples corresponding to technical features in aspects described earlier in "Summary" may be replaced or combined in order to solve a part of a whole of the aforementioned problems or produce a part of a whole of the aforementioned effects. Except for elements mentioned in independent claims, elements in the foregoing embodiments and variation/modification examples are optional and may be omitted.

This application claims priority under 35 U.S.C. § 119 to Japanese Patent Application No. 2015-248272, filed Dec. 21, 2015. The entire disclosure of Japanese Patent Application No. 2015-248272 is hereby incorporated herein by reference.

What is claimed is:

1. A printing apparatus, comprising:
   a printing section that prints out print data onto a medium;
   an imaging section that captures an image of a print result on the medium; and
   an error notification section that performs error notification in a case of occurrence of an error during the printing of the print data,
   wherein the error notification section judges whether to issue an error notice or not depending on whether an entry/exit management system that records movement of people into and out of a work area indicates that a specified predetermined person is within the work area,
   wherein, in a case of an affirmative judgment to issue the error notice, the error notification section acquires a print image showing the print result by using the imaging section and transmits the acquired print image together with the error notice to the specified predetermined person, and
   wherein when a nozzle detection portion that detects an error nozzle that is not ejecting properly, the printing section prints a color-limited check pattern using the error nozzle as well as another nozzle that is ejecting properly and which a color is same as the error nozzle, the imaging section captures the printed color-limited check pattern, and the error notification section sends to the image of the color-limited check pattern to a user device of the specified predetermined person.

2. The printing apparatus according to claim 1, wherein, in a case of the affirmative judgment to issue the error notice, the error notification section transmits the acquired print image together with the error notice to a predetermined information terminal concerning the specified predetermined person.

3. The printing apparatus according to claim 1, wherein, after the acquisition of the print image, the error notification section performs color conversion on the print image in accordance with a color space of the information terminal, and transmits a color-converted image, which is an image after the color conversion, as the transmitted image mentioned above.

4. The printing apparatus according to claim 1, wherein, after the acquisition of the print image, the error notification section causes the printing section to print an image quality check pattern as new print data, acquires a print image showing a print result regarding the image quality check pattern by using the imaging section, and transmits both the print image regarding the print data and the print image regarding the image quality check pattern as the transmitted image mentioned above.

5. The printing apparatus according to claim 3, further comprising:
   an apparatus status monitoring section that monitors status of the printing apparatus at predetermined timing that is irrelevant to time of occurrence of the error,
   wherein the apparatus status monitoring section judges whether to issue an error notice or not depending on whether an entry/exit management system that records movement of people into and out of a work area indicates that a specified predetermined person (MN) is within the work area, and
   wherein, in a case of the affirmative judgment to issue the error notice, the apparatus status monitoring section causes the printing section to print an image quality check pattern as new print data, acquires a print image showing a print result regarding the image quality check pattern by using the imaging section, and transmits the acquired print image to the specified predetermined person.

6. A printing apparatus, comprising:

a printing section that prints out print data onto a medium;

an imaging section that captures an image of a print result on the medium; and an error notification section that performs error notification in a case of occurrence of an error during the printing of the print data, wherein the error notification section judges whether to issue an error notice or not depending on whether an entry/exit management system that records movement of people into and out of a work area indicates that a specified predetermined person is within the work area, wherein, in a case of an affirmative judgment to issue the error notice, the error notification section causes the printing section to print an image quality check pattern as new print data, acquires a print image showing a print result regarding the image quality check pattern by using the imaging section, and transmits the acquired print image together with the error notice to the specified predetermined person, and wherein when a nozzle detection portion that detects an error nozzle that is not ejecting properly, the printing section prints a color-limited check pattern using the error nozzle as well as another nozzle that is ejecting properly and which a color is same as the error nozzle, the imaging section captures the printed color-limited check pattern, and the error notification section sends to the image of the color-limited check pattern to a user device of the specified predetermined person.

7. A printing apparatus, comprising:

a printing section that prints out print data onto a medium;

an imaging section that captures an image of a print result on the medium; and an error notification section that notifies a specified person of an error in a case of occurrence of the error during the printing of the print data, wherein the error notification section judges whether the specified person is absent inside a predetermined area that encompasses the printing apparatus or not depending on whether an entry/exit management system that records movement of people into and out of the predetermined area indicates that a specified predetermined person is within the predetermined area, wherein, in a case where the specified person is judged to be absent, the error notification section acquires a print image showing the print result by using the imaging section, and transmits the acquired print image together with the error notice to a predetermined information terminal concerning the specified predetermined person, and wherein when a nozzle detection portion that detects an error nozzle that is not ejecting properly, the printing section prints a color-limited check pattern using the error nozzle as well as another nozzle that is ejecting properly and which a color is same as the error nozzle, the imaging section captures the printed color-limited check pattern, and the error notification section sends to the image of the color-limited check pattern to a user device of the specified predetermined person.

* * * * *